(12) United States Patent
Gordon

(10) Patent No.: US 10,011,220 B1
(45) Date of Patent: Jul. 3, 2018

(54) PROTECTIVE COVER FOR VEHICLE BUTTON CONTROL PANEL

(71) Applicant: Zarren Gordon, West Park, FL (US)

(72) Inventor: Zarren Gordon, West Park, FL (US)

( * ) Notice: Subject to any disclaimer, the term of this patent is extended or adjusted under 35 U.S.C. 154(b) by 80 days.

(21) Appl. No.: 15/340,327

(22) Filed: Nov. 1, 2016

(51) Int. Cl.
| | |
|---|---|
| *B60J 5/04* | (2006.01) |
| *B60Q 3/02* | (2006.01) |
| *F21V 3/04* | (2018.01) |
| *F21V 23/04* | (2006.01) |
| *F21V 23/02* | (2006.01) |
| *F21V 3/06* | (2018.01) |
| *F21Y 115/10* | (2016.01) |

(52) U.S. Cl.
CPC .......... *B60Q 3/0243* (2013.01); *B60J 5/0416* (2013.01); *B60Q 3/0296* (2013.01); *F21V 3/0436* (2013.01); *F21V 3/062* (2018.02); *F21V 23/023* (2013.01); *F21V 23/0464* (2013.01); *F21Y 2115/10* (2016.08)

(58) Field of Classification Search
CPC ...... B60Q 3/0243; B60Q 3/0296; B60Q 3/00; B60Q 3/02; B60Q 3/0203; B60Q 3/0209; B60Q 3/0279; F21V 3/062; F21V 3/0436; F21V 23/023; F21V 23/0464; B60J 5/0416; B60R 13/02; F21Y 2115/10
See application file for complete search history.

(56) References Cited

U.S. PATENT DOCUMENTS

| | | | |
|---|---|---|---|
| 3,316,379 A | 4/1967 | Clarke | |
| 4,298,778 A | 11/1981 | Beresford-Jones | |
| 5,040,162 A | 8/1991 | De Rozarieux et al. | |
| 5,434,757 A * | 7/1995 | Kashiwagi | B60N 2/797 362/501 |
| 6,050,407 A | 4/2000 | Trujillo | |
| 6,536,825 B2 | 3/2003 | McAndrew | |
| 6,820,921 B2 | 11/2004 | Uleski | |
| 7,002,089 B2 * | 2/2006 | Stevenson | H01H 13/702 200/312 |
| 8,138,434 B2 | 3/2012 | Tang | |
| 2005/0098456 A1 | 5/2005 | Hodges | |
| 2005/0241930 A1 * | 11/2005 | Stevenson | H01H 13/702 200/512 |

* cited by examiner

*Primary Examiner* — Joseph L Williams
*Assistant Examiner* — Jose M Diaz
(74) *Attorney, Agent, or Firm* — Kyle A. Fletcher, Esq.

(57) ABSTRACT

The protective cover for vehicle button control panel is a protective barrier that is adapted for use with the interior door control panel of an automobile door. The protective cover for vehicle button control panel is a transparent barrier that is placed on top of the interior door control panel for the purpose of protecting the plurality of individual controls. The protective cover for vehicle button control panel is a plastic shield that fits over the interior door control panel such that the control switches of the interior door control panel can be operated through the plastic shield. The protective cover for vehicle button control panel further illuminates the interior door control panel to simplify the operation of the interior door control panel. The protective cover for vehicle button control panel comprises a guard, a lighting system, and an adhesive.

20 Claims, 5 Drawing Sheets

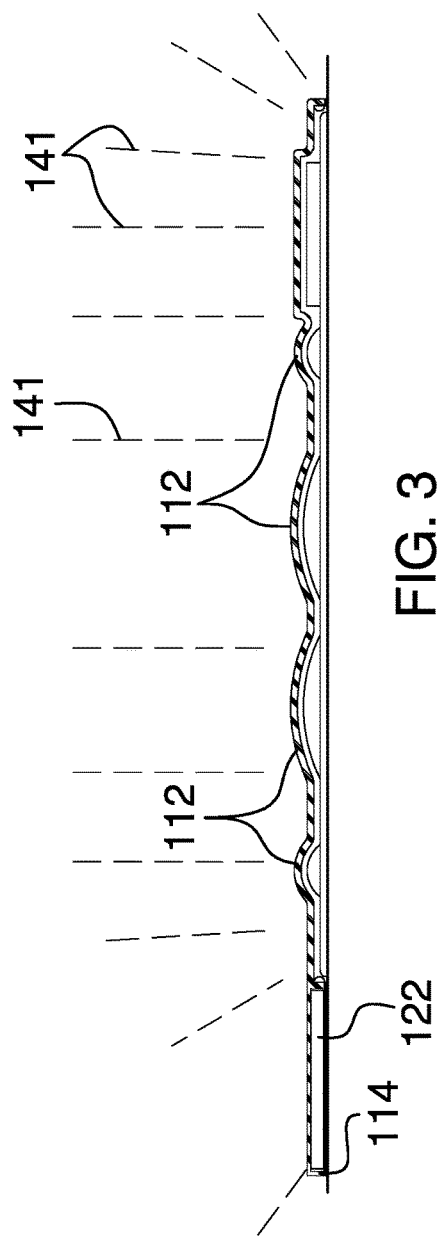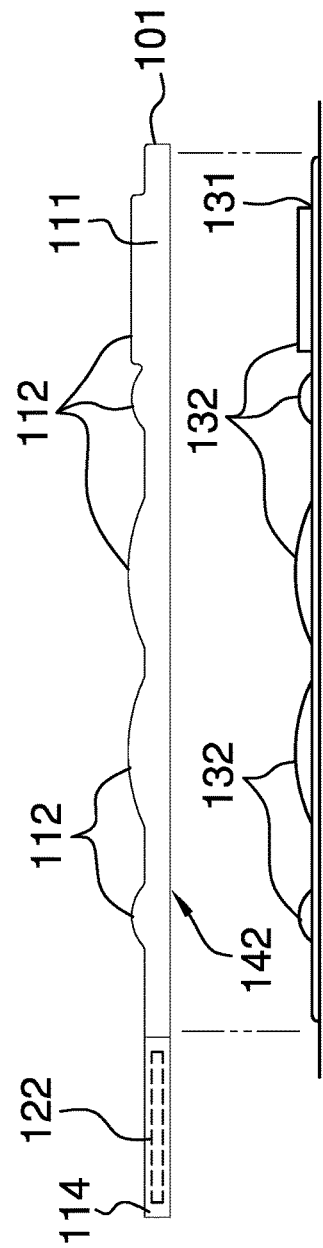

form the design of other structures, methods, and systems for carrying out the several purposes of the protective cover for vehicle button control panel.

PROTECTIVE COVER FOR VEHICLE BUTTON CONTROL PANEL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electric elements including electric switches, more specifically, protective casing or cover for a switch.

SUMMARY OF INVENTION

The protective cover for vehicle button control panel is a protective barrier that is adapted for use with an automobile door. The protective cover for vehicle button control panel is adapted for use in protecting the interior door control panel of the automobile that further comprises a plurality of individual controls. Each of the plurality of individual controls is an electrical device that is used to operate and control a function associated with the automobile. The plurality of individual controls is further organized into a plurality of mirror controls, a plurality of window controls, and a door lock control. The protective cover for vehicle button control panel is a transparent barrier that is placed on top of the interior door control panel for the purpose of protecting the plurality of individual controls from dust, debris, and spilt liquids that can interfere with the operation of the automobile. The protective cover for vehicle button control panel is a plastic shield. The protective cover for vehicle button control panel fits over the interior door control panel such that the plurality of individual controls can be operated through the plastic shield. The protective cover for vehicle button control panel further illuminates the interior door control panel to further simplify the operation of the interior door control panel in darkness.

These together with additional objects, features and advantages of the protective cover for vehicle button control panel will be readily apparent to those of ordinary skill in the art upon reading the following detailed description of the presently preferred, but nonetheless illustrative, embodiments when taken in conjunction with the accompanying drawings.

In this respect, before explaining the current embodiments of the protective cover for vehicle button control panel in detail, it is to be understood that the protective cover for vehicle button control panel is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the protective cover for vehicle button control panel.

It is therefore important that the claims be regarded as including such equivalent construction insofar as they do not depart from the spirit and scope of the protective cover for vehicle button control panel. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 3 is a cross-sectional view of an embodiment of the disclosure across 3-3 as shown in FIG. 1.

FIG. 4 is an expanded side view of an embodiment of the disclosure.

DETAILED DESCRIPTION OF THE EMBODIMENT

Figure 1:
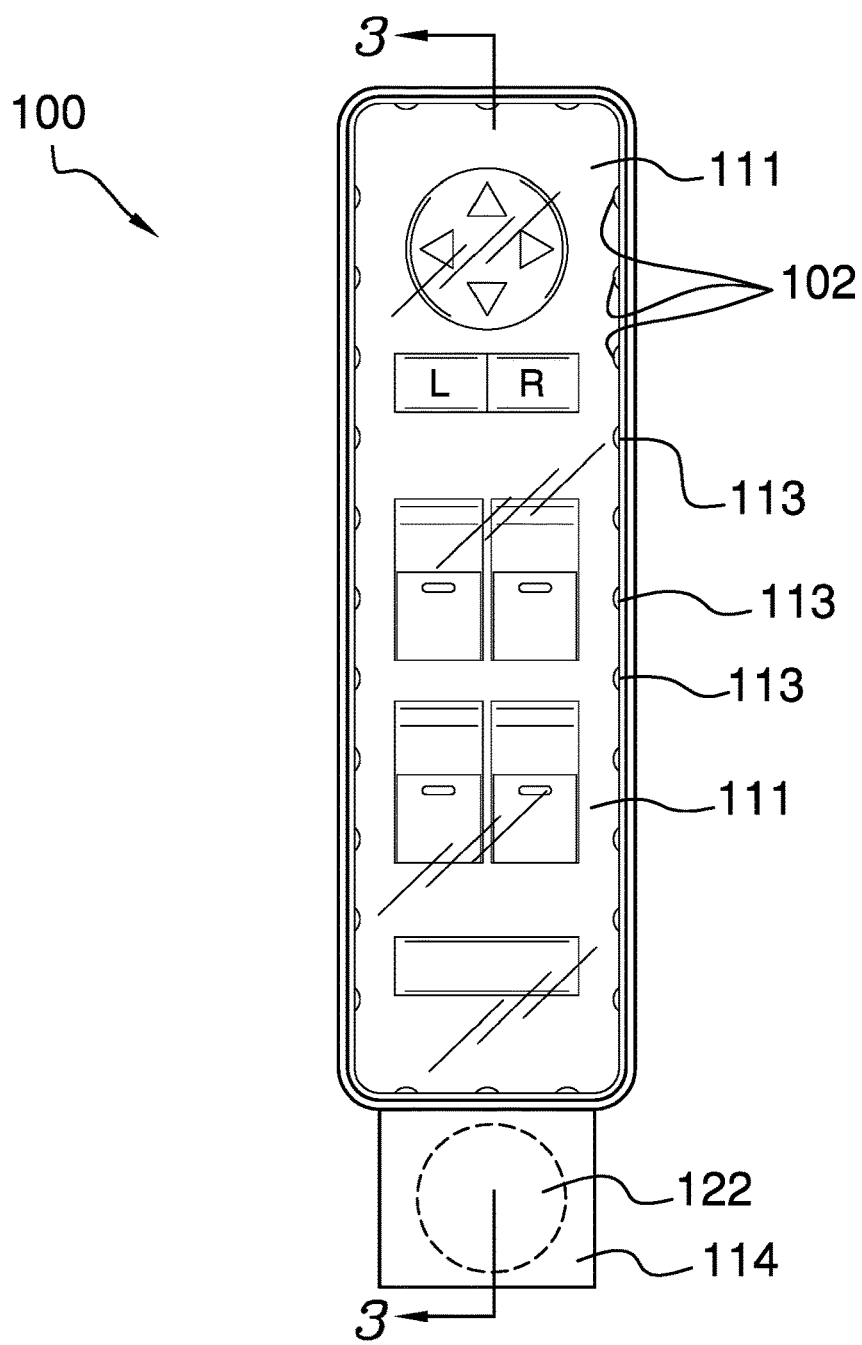
FIG. 1 is a top view of an embodiment of the disclosure.
Figure 2:
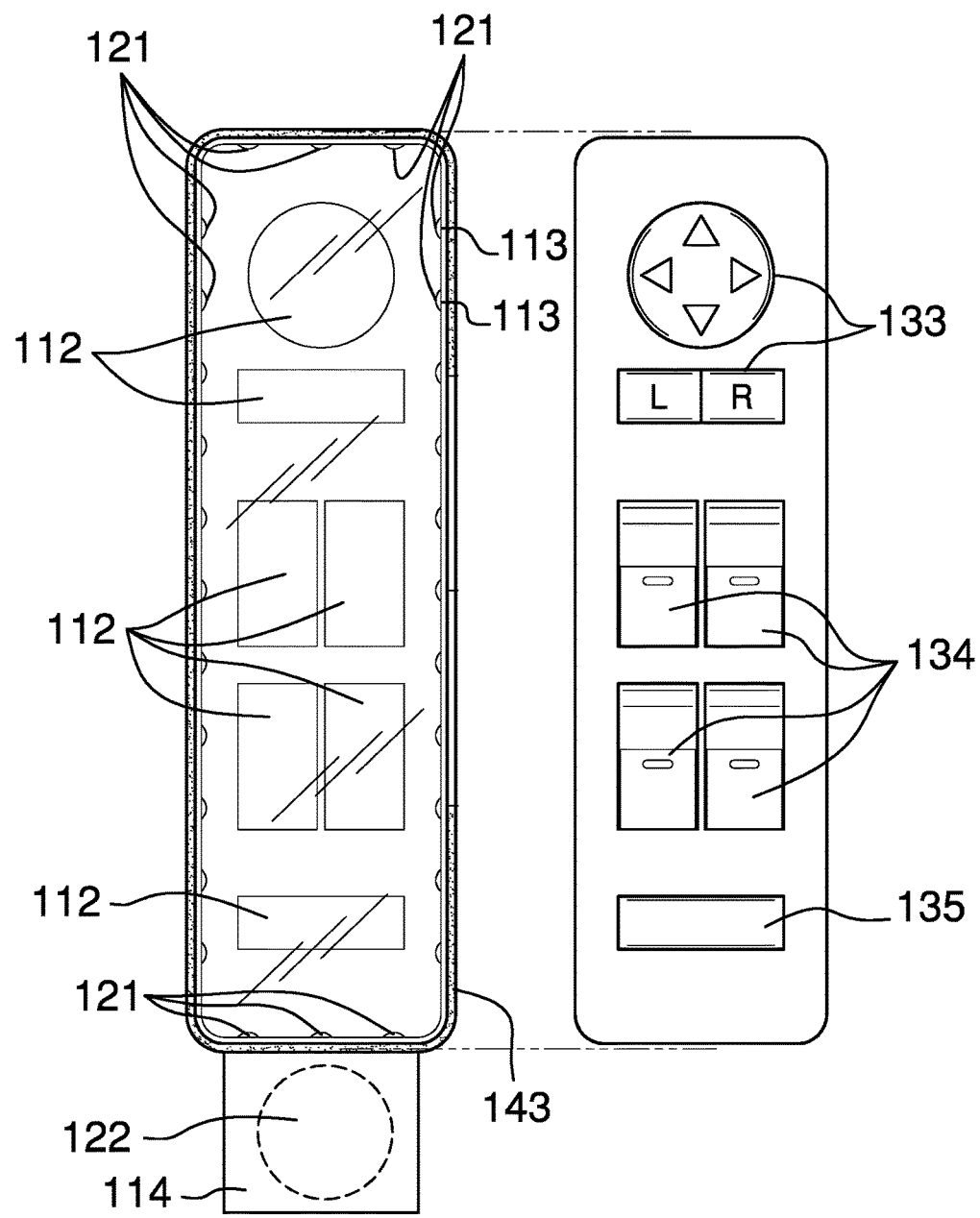
FIG. 2 is an expanded view of an embodiment of the disclosure.
Figure 5:
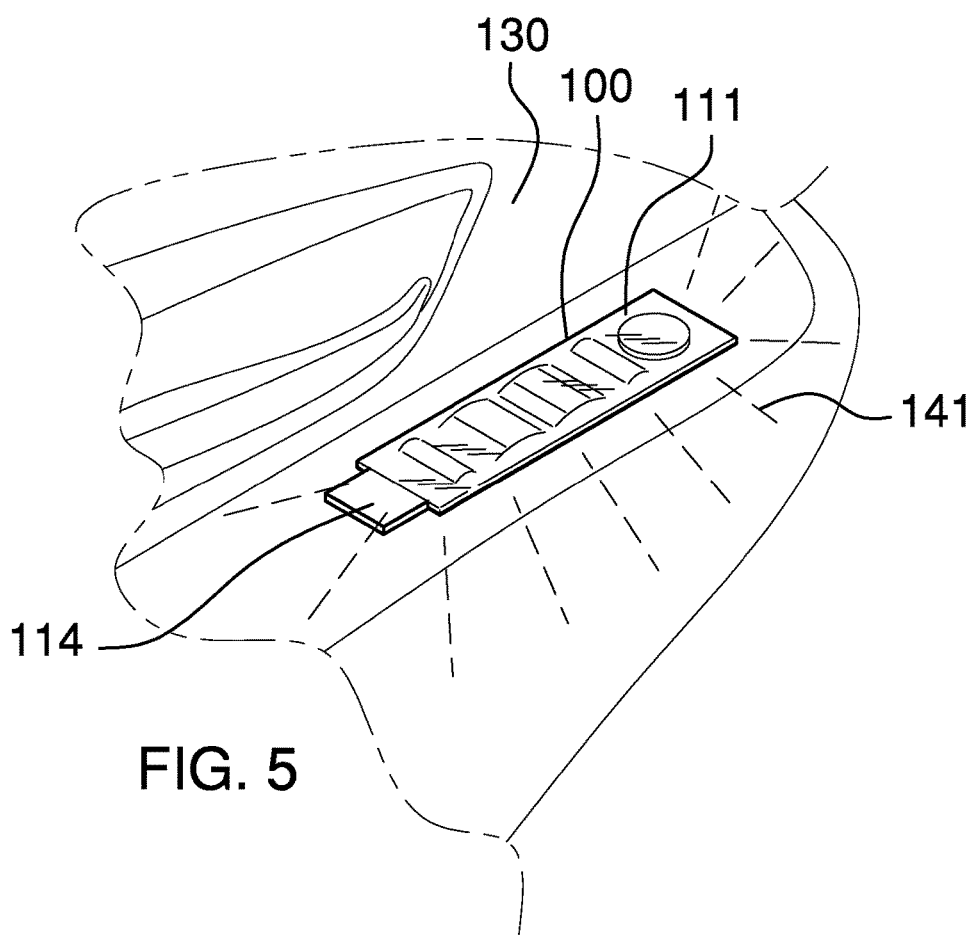
FIG. 5 is an in use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6C.

The protective cover for vehicle button control panel 100 (hereinafter invention) comprises a guard 101, a lighting system 102, and an adhesive 103. The lighting system 102 is mounted on the guard 101. The guard 101 is attached to the interior door control panel 131 with the adhesive 103. The invention 100 is a protective barrier that is adapted for use with an automobile door 130. The invention 100 is adapted for use in protecting the interior door control panel 131 of the automobile door 130. The interior door control panel 131 further comprises a plurality of individual controls 132. Each of the plurality of individual controls 132 is an electrical device that is used to operate and control a function associated with an automobile. The plurality of individual controls 132 is further organized into a plurality of mirror controls 133, a plurality of window controls 134, and a door lock control 135. The invention 100 is a transparent barrier that is placed on top of the interior door control panel 131 for the purpose of protecting the plurality of individual controls 132 from dust, debris, and spilt liquids. The invention 100 fits over the interior door control panel 131 such that the plurality of individual controls 132 can be operated through the invention 100. The invention 100 further illuminates 141 the interior door control panel 131 to assist in the operation of the interior door control panel 131 in darkness.

The specification and claims of this disclosure will hereinafter implicitly assume that the invention 100 is designed for use with the interior door control panel 131 associated with the driver's side door of the automobile. This assumption is made for the purposes of simplicity and for clarity of exposition of the disclosure is not intended to limit the scope of the appended claims. Those skilled in the art will recognize that the disclosure can be readily modified to accommodate the passenger's side door for most, if not all, automobiles with a minimum of modification and experimentation by removing the accommodations described within this disclosure for the plurality of mirror controls 133.

The guard 101 comprises a plastic shield 111, a plurality of impressions 112, and a plurality of LED mounts 113, and a battery chamber 114. The plastic shield 111 forms the core structure of the guard 101. The plastic shield 111 is a plastic semi-rigid structure that deforms under force in an elastic manner. The plurality of impressions 112 and the plurality of the LED mounts 113 are formed in the plastic shield 111. The battery chamber 114 is attached to the plastic shield 111.

The plastic shield 111 is a single structure that is placed directly on top of the plurality of individual controls 132 of the interior door control panel 131. The semi-rigid structure of the plastic shield 111 allows each of the individual controls selected from the plurality of individual controls 132 to be manipulated through the application of force through the plastic shield 111. The plastic shield 111 is further defined with an underside 142 and a perimeter 143. The underside 142 of the plastic shield 111 is the surface of the plastic shield 111 that is proximal to the interior door control panel 131 when the plastic shield 111 is properly installed. As shown most clearly in FIGS. 2 and 4, the plastic shield 111 has a plate like appearance in the sense that the span of the dimension of the plastic shield 111 in the direction perpendicular to the surface of the interior door control panel 131 (the thickness dimension) has a thin appearance relative to both the span of the length dimension and the span of the width dimension.

Each of the plurality of impressions 112 is an impression that is formed within the plastic shield 111 such that the underside 142 of the plastic shield 111 forms the concave side of each of the plurality of impressions 112. Each impression selected from the plurality of impressions 112 corresponds to an individual control selected from the plurality of individual controls 132. In addition, each individual control selected from the plurality of individual controls 132 corresponds to an impression selected from the plurality of impressions 112. The form factor of each impression selected from the plurality of impressions 112 is a mirror image of its corresponding individual control selected from the plurality of individual controls 132 such that an exact, or custom, fit is formed when the corresponding individual control is inserted into the selected impression. The nature of the exact fit requires that each instantiation of the invention 100 be individually designed for the make, model ad door location of the automobile door 130 that the invention 100 is intended to be used with.

The perimeter 143 of the plastic shield 111 is further formed with the plurality of LED mounts 113. The plurality of LED mounts 113 is a plurality of apertures that are intended to receive the leads of each of the plurality of LEDs 121 such that each individual LED can be mounted on the plastic shield 111. The plurality of LEDs 121 is discussed in greater detail elsewhere in this disclosure. As shown most clearly in FIGS. 1 and 4, the battery chamber 114 is a container that is attached to the perimeter 143 of the plastic shield 111. The purpose of the battery chamber 114 is to store a battery 122. The battery 122 is discussed in greater detail elsewhere in this disclosure.

The lighting system 102 comprises a plurality of LEDs 121, a battery 122, and a photoswitch 124. As shown most clearly in FIG. 6A, the plurality of LEDs 121, the battery 122, and the photoswitch 124 are connected in a series circuit.

Figure 6A:
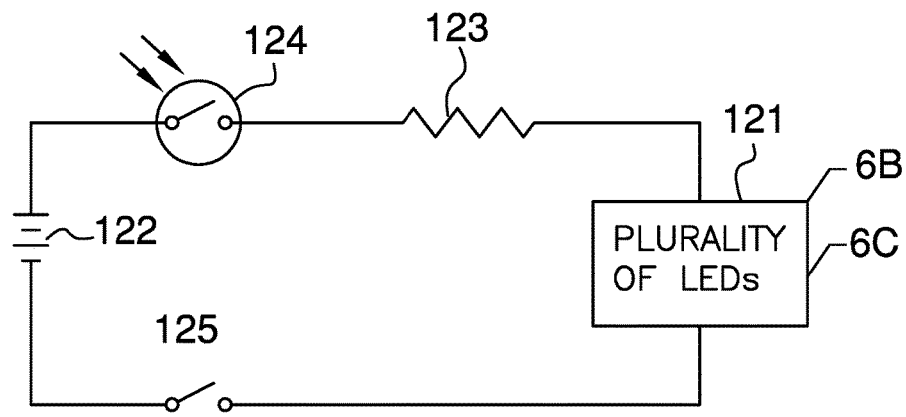
FIG. 6A is a schematic view of an embodiment of the disclosure.
Figure 6B:
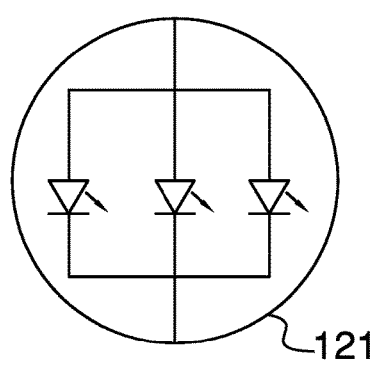
FIG. 6B is a schematic view of an embodiment of the disclosure.
Figure 6C:
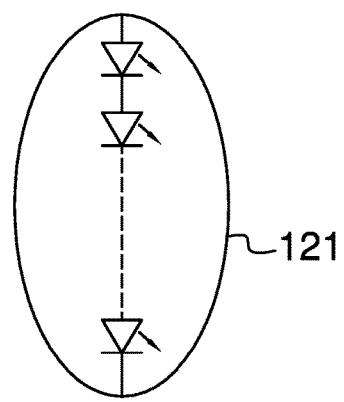
FIG. 6C is a schematic view of an embodiment of the disclosure.

Each LED selected from the plurality of LEDs 121 is a readily and commercially available light emitting diode that is used, in combination with the LEDs remaining in the plurality of LEDs 121 to illuminate 141 the interior door control panel 131. Each of the plurality of LEDs 121 is identical. Any LED selected from the plurality of LEDs 121 is wired to the remaining LEDs contained within the plurality of LEDs 121 to form a circuit selected from the group consisting of a parallel circuit, as shown in FIG. 6B, or a series circuit, as shown in FIG. 6C. The optimal selection between a series circuit and a parallel circuit is a function of several factors including, but not limited to, the voltage of the selected battery 122, the coulomb capacity of the selected battery 122, the LED selected for incorporation into the plurality of LEDs 121, and desired failure characteristics desired from the lighting system 102 should an LED selected from the plurality of LEDs 121 fail. In the first potential embodiment of the disclosure, the selected circuit form is parallel.

The battery 122 is a readily and commercially available battery 122 that is used to power the plurality of LEDs 121 to provide illumination 141. In the first potential embodiment of the disclosure, as shown most clearly in FIGS. 1 and 2, the battery 122 is a button cell battery.

The purpose of the photoswitch 124 is to limit the illumination 141 of the plurality of LEDs 121 to periods of darkness. Specifically, the photoswitch 124 is an electrical device that closes an electric circuit in response to the exposure of the photoswitch 124 to darkness. The photoswitch 124 opens the electric circuit in response to the exposure of the photoswitch 124 to light. Methods to design and use photoswitches are well known and documented in the electrical arts.

The lighting system 102 further comprises a master switch 125. As shown in FIG. 6A, the master switch 125 is placed in a series circuit with the plurality of LEDs 121, the battery 122, and the photoswitch 124. The master switch 125 acts as an on off switch that allows the user to prevent the illumination 141 of the plurality of LEDs 121 when the use of the invention 100 is not required.

The lighting system 102 further comprises a limit resistor 123. The purpose of the limit resistor 123 is to protect the electrical components contained within the lighting system 102 by limiting the amount of current that can flow through the electric circuit that forms the lighting system 102. As shown in FIG. 6A, the limit resistor 123 is placed in a series circuit with the plurality of LEDs 121, a battery 122, the master switch 125, and the photoswitch 124.

In the first potential embodiment of the disclosure, a removable adhesive 103 is used to attach the guard 101 to the interior door control panel 131. The use of a pressure sensitive adhesive 103 is recommended.

The use the invention 100, the battery 122 is installed into the lighting system 102 and the adhesive 103 is applied to the underside 142 of the plastic shield 111. The plastic shield 111 is positioned over the interior door control panel 131 such that each individual control selected from the plurality of individual controls 132 is aligned and inserted into the corresponding impression selected from the plurality of impressions 112. Pressure is then applied to activate the adhesive 103. Each of the plurality of individual controls 132 is operated normally through the plastic shield 111.

In the first potential embodiment of the disclosure, the guard 101 is formed as a single unit from molded plastic. It is preferred that LEDs that emit blue light be used each of the plurality of LEDs 121. The remaining components described in this disclosure are readily and commercially available.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Automobile: As used in this disclosure, an automobile is a road vehicle that that specializes in carrying passengers and light cargo loads. This definition is specifically intended to include vehicles generally referred to as pickup trucks, vans, and minivans.

Battery: As used in this disclosure, a battery is a container consisting of one or more cells, in which chemical energy is converted into electricity and used as a source of power.

Button Cell Battery: As used in this disclosure, a button cell battery is a disk shaped battery that is commonly used in powering watches.

Concave: As used in this disclosure, concave is used to describe: 1) a surface that resembles the interior surface of a sphere; or, 2) a function with a curvature structure wherein a chord that connects any two points of the function will be lesser than (graphically below) or equal to the value of the function at any point along the chord.

Correspond: As used in this disclosure, the term correspond means that a first object is in some manner linked to a second object in a one to one fashion.

Diode: As used in this disclosure, a diode is a two terminal semiconductor device that allows current flow in only one direction. The two terminals are called the anode and the cathode.

Elastic: As used in this disclosure, an elastic is a material or object that deforms when a force is applied to it and that is able to return to its original shape after the force is removed. A material that exhibits these qualities is also referred to as an elastomeric material.

Form Factor: As used in this disclosure, the term form factor refers to the size and shape of an object.

LED: As used in this disclosure, an LED is an acronym for a light emitting diode. A light emitting diode is a diode that is also a light source. Because of close operational correspondence of the function of the cathode and anode of an organic LEDs and the cathode and anode of a semiconductor LED, organic LEDs are included in this definition.

Perimeter: As used in this disclosure, a perimeter is one or more curved or straight lines that bounds an enclosed area on a plane or surface. The perimeter of a circle is commonly referred to as a circumference.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photoswitch: As used in this disclosure, a photoswitch is a switch that is actuated with light. The operation of a photoswitch is often based on the use of a photoelectric device.

Plate: As used in this disclosure, a plate is a smooth, flat and rigid object that has at least one dimension that: 1) is of uniform thickness; and 2) that appears thin relative to the other dimensions of the object. Plates often have a rectangular or disk like appearance. As defined in this disclosure, plates may be made of any material, but are commonly made of metal.

Removable Adhesive: As used in this disclosure, a removable adhesive is an commercially available adhesive that is designed with a lower tack, or stickiness, such that a first object is attached to a second object with a removable adhesive the first object can be readily removed in a manner that ideally, though not necessarily practically, leaves behind no adhesive residue on the second object. A repositionable adhesive is a subset of removable adhesives that are intended to allow the first object to be reattached to a third object or the second object in the initial or a different position. Within this disclosure, a removable adhesive is assumed to include repositionable adhesives.

Rigid Structure: As used in this disclosure, a rigid structure is a solid structure that is inflexible and will not deform before breaking under a force.

Semi-Rigid Structure: As used in this disclosure, a semi-rigid structure is a solid structure that is stiff but not wholly inflexible and that will deform under force before breaking. A semi-rigid structure may or may not behave in an elastic fashion in that a semi-rigid structure need not return to a relaxed shape.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Vehicle: As used in this disclosure, a vehicle is a device that is used transporting carrying passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 6C include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A protective cover comprising:
a guard and a lighting system;
wherein the lighting system is mounted on the guard;
wherein the protective cover is adapted for use in protecting an interior door control panel of an automobile door;
wherein the interior door control panel further comprises a plurality of individual controls;
wherein each of the plurality of individual controls is an electrical device;
wherein the protective cover is a protective barrier that is adapted for use with an automobile door;
wherein the protective cover is a transparent barrier;
wherein the protective cover fits over the interior door control panel such that the plurality of individual controls can be operated through the protective cover;
wherein the guard is attached to the interior door control panel;
wherein the lighting system illuminates the interior door control panel to assist in the operation of the interior door control panel in darkness.

2. The protective cover according to claim 1
wherein the guard comprises a plastic shield, a plurality of impressions, a plurality of LED mounts, and a battery chamber;
wherein the plastic shield forms the core structure of the guard;
wherein the plastic shield is a transparent plastic semi-rigid structure that deforms under force in an elastic manner;
wherein the plurality of impressions and the plurality of the LED mounts are formed in the plastic shield;
wherein the battery chamber is attached to the plastic shield.

3. The protective cover according to claim 2
wherein the plastic shield is further defined with an underside and a perimeter;
wherein the plastic shield is placed on top of the plurality of individual controls of the interior door control panel.

4. The protective cover according to claim 3 wherein each of the plurality of impressions is an impression that is formed within the plastic shield such that the underside of the plastic shield forms the concave side of each of the plurality of impressions.

5. The protective cover according to claim 4
wherein each impression selected from the plurality of impressions corresponds to an individual control selected from the plurality of individual controls;
wherein each individual control selected from the plurality of individual controls corresponds to an impression selected from the plurality of impressions.

6. The protective cover according to claim 5 wherein the form factor of each impression selected from the plurality of impressions is a mirror image of its corresponding individual control selected from the plurality of individual controls such that a fit is formed when the corresponding individual control is inserted into the selected impression.

7. The protective cover according to claim 6
wherein the perimeter of the plastic shield is further formed with the plurality of LED mounts;
wherein the plurality of LED mounts are a plurality of apertures that are intended to receive each of the plurality of LEDs.

8. The protective cover according to claim 7
wherein the battery chamber is a container that is attached to the perimeter of the plastic shield;
wherein the battery chamber contains a battery.

9. The protective cover according to claim 8
wherein the lighting system comprises a plurality of LEDs, the battery, and a photoswitch;
wherein the plurality of LEDs, the battery, and the photoswitch are connected in a series circuit;
wherein the battery powers the plurality of LEDs.

10. The protective cover according to claim 9
wherein each LED selected from the plurality of LEDs is a light emitting diode that is used in combination with the LEDs remaining in the plurality of LEDs to illuminate the interior door control panel;
wherein each of the plurality of LEDs is identical.

11. The protective cover according to claim 10
wherein each LED selected from the plurality of LEDs emits blue light.

12. The protective cover according to claim 11
wherein the photoswitch limits the illumination of the plurality of LEDs to periods of darkness;
wherein the photoswitch is an electrical device that closes an electric circuit in response to the exposure of the photoswitch to darkness;
wherein the photoswitch opens the electric circuit in response to the exposure of the photoswitch to light.

13. The protective cover according to claim 12
wherein the lighting system further comprises a master switch;
wherein the master switch is placed in a series circuit with the plurality of LEDs, the battery, and the photoswitch.

14. The protective cover according to claim 13
wherein the lighting system further comprises a limit resistor;
wherein the limit resistor is placed in a series circuit with the plurality of LEDs, a battery, the master switch, and the photoswitch.

15. The protective cover according to claim 14
wherein the protective cover further comprises an adhesive;
wherein the guard is attached to the interior door control panel with the adhesive.

16. The protective cover according to claim 15 wherein any LED selected from the plurality of LEDs is wired to the remaining LEDs contained within the plurality of LEDs to form a parallel circuit.

17. The protective cover according to claim 16 wherein the battery is a button cell battery.

18. The protective cover according to claim 1
wherein the lighting system comprises a plurality of LEDs, a battery, and a photoswitch;
wherein the battery powers the plurality of LEDs;
wherein each LED selected from the plurality of LEDs is a light emitting diode that is used in combination with the LEDs remaining in the plurality of LEDs to illuminate the interior door control panel;
wherein each LED selected from the plurality of LEDs emits blue light;
wherein the photoswitch limits the illumination of the plurality of LEDs to periods of darkness;

wherein the photoswitch is an electrical device that closes an electric circuit in response to the exposure of the photoswitch to darkness;

wherein the photoswitch opens the electric circuit in response to the exposure of the photoswitch to light;

wherein the lighting system further comprises a master switch;

wherein the master switch is placed in a series circuit with the plurality of LEDs, the battery, and the photoswitch.

19. The protective cover according to claim 18 wherein the guard comprises a plastic shield, a plurality of impressions, and a plurality of LED mounts;

wherein the plastic shield forms the core structure of the guard;

wherein the plastic shield is a transparent plastic semi-rigid structure that deforms under force in an elastic manner;

wherein the plurality of impressions and the plurality of the LED mounts are formed in the plastic shield;

wherein the plastic shield is further defined with an underside and a perimeter;

wherein the plastic shield is placed on top of the plurality of individual controls of the interior door control panel;

wherein each of the plurality of impressions is an impression that is formed within the plastic shield such that the underside of the plastic shield forms the concave side of each of the plurality of impressions;

wherein each impression selected from the plurality of impressions corresponds to an individual control selected from the plurality of individual controls;

wherein each individual control selected from the plurality of individual controls corresponds to an impression selected from the plurality of impressions;

wherein the form factor of each impression selected from the plurality of impressions is a mirror image of its corresponding individual control selected from the plurality of individual controls such that a fit is formed when the corresponding individual control is inserted into the selected impression.

20. The protective cover according to claim 19 wherein the lighting system further comprises a limit resistor;

wherein the limit resistor is placed in a series circuit with the plurality of LEDs, a battery, the master switch, and the photoswitch;

wherein the protective cover further comprises an adhesive;

wherein the guard is attached to the interior door control panel with the adhesive;

wherein any LED selected from the plurality of LEDs is wired to the remaining LEDs contained within the plurality of LEDs to form a parallel circuit;

wherein the battery is a button cell battery.

\* \* \* \* \*